United States Patent
Kwon et al.

(10) Patent No.: US 12,494,519 B2
(45) Date of Patent: Dec. 9, 2025

(54) SECONDARY BATTERY AND DETECTING SYSTEM

(71) Applicant: LG ENERGY SOLUTION, LTD., Seoul (KR)

(72) Inventors: O Jong Kwon, Daejeon (KR); Ki Woong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 518 days.

(21) Appl. No.: 17/986,564

(22) Filed: Nov. 14, 2022

(65) Prior Publication Data
US 2023/0155193 A1    May 18, 2023

(30) Foreign Application Priority Data

Nov. 16, 2021    (KR) .................. 10-2021-0158076

(51) Int. Cl.
*H01M 10/48*    (2006.01)
*H01M 4/66*    (2006.01)
*H01M 10/04*    (2006.01)

(52) U.S. Cl.
CPC .......... *H01M 10/48* (2013.01); *H01M 4/661* (2013.01); *H01M 10/0468* (2013.01)

(58) Field of Classification Search
CPC ... H01M 10/48; H01M 4/661; H01M 10/0468
See application file for complete search history.

(56) References Cited

U.S. PATENT DOCUMENTS

| | | | |
|---|---|---|---|
| 2013/0004811 A1* | 1/2013 | Banerjee | H01M 10/443 374/185 |
| 2014/0370338 A1 | 12/2014 | Lim | |
| 2015/0303444 A1 | 10/2015 | Wang et al. | |
| 2017/0054128 A1* | 2/2017 | Robert | H01M 10/486 |
| 2018/0042556 A1* | 2/2018 | Shahparnia | A61B 5/282 |
| 2020/0076016 A1 | 3/2020 | Riemer et al. | |
| 2020/0412146 A1* | 12/2020 | Takechi | H02J 7/005 |
| 2021/0119309 A1 | 4/2021 | Jeong et al. | |
| 2021/0184296 A1 | 6/2021 | Lee et al. | |
| 2022/0102822 A1 | 3/2022 | Lee | |

(Continued)

FOREIGN PATENT DOCUMENTS

| | | |
|---|---|---|
| CN | 104488114 A | 4/2015 |
| JP | H10270094 A | 10/1998 |
| JP | 2021536585 A | 12/2021 |

(Continued)

*Primary Examiner* — Michael N Orlando
(74) *Attorney, Agent, or Firm* — Lerner David LLP (57) ABSTRACT

The present invention relates to a secondary battery in which a temperature sensor is used to trace temperatures in real-time at several positions within the secondary battery and specify a time and point at which abnormal heat generation starts, to prevent deterioration due to transfer of heat to the whole system and improve safety of a product and stability of the whole system, and a detecting system. The secondary battery according to the present invention includes an electrode assembly, in which a plurality of unit cells including a positive electrode, a negative electrode, and a separator are stacked, and a case in which the electrode assembly is accommodated. The electrode assembly further includes a temperature sensor that measures a temperature therein.

11 Claims, 5 Drawing Sheets

(56) References Cited

U.S. PATENT DOCUMENTS

2022/0278386 A1   9/2022   Cho et al.

FOREIGN PATENT DOCUMENTS

| KR | 20140131716 A | 11/2014 |
| KR | 20140144789 A | 12/2014 |
| KR | 20160070767 A | 6/2016 |
| KR | 20160144224 A | 12/2016 |
| KR | 20200080076 A | 7/2020 |
| KR | 20210004179 A | 1/2021 |
| KR | 20210017548 A | 2/2021 |
| KR | 20210033647 A | 3/2021 |
| KR | 20210040720 A | 4/2021 |
| KR | 20210069146 A | 6/2021 |
| KR | 20210098216 A | 8/2021 |

* cited by examiner

SECONDARY BATTERY AND DETECTING SYSTEM

CROSS-REFERENCE TO RELATED APPLICATIONS

This application claims the priority of Korean Patent Application No. 10-2021-0158076 filed on Nov. 16, 2021, in the Korean Intellectual Property Office, the disclosure of which is incorporated herein by reference.

BACKGROUND OF THE INVENTION

Field of the Invention

The present invention relates to a secondary battery and a detecting system, and more particularly, to a secondary battery which is prevented from being deteriorated by heat transferred to the whole system to improve safety of a product and stability of the whole system, and a detecting system.

Description of the Related Art

Recently, as interests about rising prices of energy sources due to depletion of fossil fuels and about environmental pollution are amplified, a need for eco-friendly alternative energy sources is indispensable for life in the future. Accordingly, research continues on various power generation technologies using sunlight, wind power, tidal power, and so on, and there is also a continuing great interest in power storage devices, such as batteries, for more efficiently using electrical energy generated through the technologies.

Moreover, as the technical development of and a demand for mobile electronic devices and electric vehicles using batteries increase, a demand for batteries as energy sources rapidly increases. Accordingly, much research is conducted on batteries that can meet the various needs.

Batteries that store electrical energy may be generally classified into primary batteries and secondary batteries. While the primary batteries are disposable consumable batteries, the secondary batteries are rechargeable batteries manufactured using a material in which a redox process between a current and a substance is repeatable. That is, when a reduction reaction is performed on the material by the current, a power supply is charged, and when an oxidation reaction is performed on the material, the power supply is discharged. Such a charging-discharging is repeatedly performed to generate electricity.

In general, types of the secondary batteries include a nickel (Ni)-cadmium (Cd) battery, a nickel (Ni)-hydrogen (H) battery, a lithium (Li)-ion battery, a lithium (Li)-ion polymer battery, and so on. Such secondary batteries are applied to and used in not only small products such as digital camera, P-DVD, MP3P, mobile phone, PDA, portable game device, power tool, and E-bike, but also large products, such as electric vehicle and hybrid vehicle, which require high output, energy storage devices for storing surplus electricity or new renewable energy, and energy storage devices for backup.

According to types of external devices to which a secondary battery is applied, the secondary battery may be used in the form of a single battery or may be used in the form of a pack or module in which multiple batteries are connected to be combined as one unit. A small mobile device such as mobile phone, may operate with an output and capacity of a single battery for a predetermined time. However, in a case where prolonged driving or high-power driving is required for, for example, an electric vehicle or hybrid vehicle having high power consumption, the number of batteries to be embedded may be increased to increase an output voltage or an output current.

When in the second battery in which multiple batteries are concentrated to be adjacent to each other, abnormal heat generation or thermal runaway/flame occurs in any one battery cell, it is likely to sequentially deteriorate the adjacent batteries and rapidly transferred to the whole system. That is, the abnormal heat generation of the battery may start from any one partial area inside the battery to lead to heat generation and thermal runaway of the entirety of the batteries or the whole system.

Accordingly, the stability of the whole system may drastically decrease and the risk of negligent accidents may increase. In addition, in the case of a battery with a large area, it is difficult to specify a point or time at which abnormal heat generation starts inside the battery, only based on an average temperature of the outside of the battery.

Thus, it is required to rapidly check an abnormal battery within the system to deal with abnormality, and particularly for the battery with a large area, it is required to trace temperatures in real-time in several positions within the battery.

SUMMARY OF THE INVENTION

An aspect of the present invention provides a secondary battery in which a temperature sensor is used to trace temperatures in real-time at several positions within a secondary battery and specify a time and point at which abnormal heat generation starts, so that action early deals with an abnormal battery in the whole system to prevent deterioration due to transfer of heat to the whole system and improve safety of a product and stability of the whole system, and a detecting system.

The secondary battery according to the present invention may include an electrode assembly, in which a plurality of unit cells including a positive electrode, a negative electrode, and a separator are stacked, and a case in which the electrode assembly is accommodated. The electrode assembly may further include a temperature sensor that measures a temperature therein.

In the electrode assembly, the positive electrode may include an aluminum (Al) collector, and the negative electrode may include a copper (Cu) collector.

The temperature sensor may be disposed between the plurality of unit cells.

The electrode assembly may include a first half cell including the positive electrode and the separator, and a second half cell including the negative electrode and the separator. The temperature sensor may be disposed between the first half cell and the second half cell.

In the electrode assembly, the temperature sensor, the first half cell, and the second half cell may be stacked between the plurality of unit cells.

The temperature sensor may be provided in the form of a sheet.

The temperature sensor may be a two-dimensional (2D) array thermocouple sheet.

The temperature sensor may include a first line including a plurality of horizontal rows, and a second line including a plurality of vertical columns. The plurality of horizontal rows and the plurality of vertical columns may cross each other to define a plurality of intersections.

In the temperature sensor, the first line may be made of chromel, and the second line may be made of alumel or constantan.

In the temperature sensor, the first line may further include a first terminal protruding from one end of the first line to one side of the case, and a connection line provided to be vertical so as to connect the first terminal to each of the plurality of horizontal rows, and the second line may further include a second terminal protruding from one end of the second line to the other side of the case and horizontally extending to be connected to each of the plurality of vertical columns.

The temperature sensor may further include a PET film wrapping and supporting the first line and the second line.

The PET film may include an upper PET film disposed on top surfaces of the first line and the second line, and a lower PET film disposed on bottom surfaces of the first line and the second line. The upper PET film may be provided on a portion excluding top surfaces of one end of the first terminal protruding to one side of the case, and one end of the second terminal protruding to the other side of the case. The lower PET film may be provided to extend up to a bottom surface of each of the first terminal and the second terminal. The temperature sensor may further include a sealing part at a boundary between the upper PET film and the lower PET film.

Another aspect of the present invention provides a detecting system, which detects a heat generation phenomenon of a secondary battery, including a temperature sensor disposed inside in the secondary battery, and a detector which is interlocked with the temperature sensor. The detector may detect whether heat is generated and a position at which heat is generated in the secondary battery, based on a value measured by the temperature sensor.

The temperature sensor may include a first line including a plurality of horizontal rows and a second line including a plurality of vertical columns. The temperature sensor may be a two-dimensional array thermocouple sheet in which the plurality of horizontal rows and the plurality of vertical columns cross each other.

The temperature sensor may further include a terminal, which protrudes from one end of each of the first line and the second line to one side of a case, and each of intersections, at which the plurality of horizontal rows and the plurality of vertical columns cross each other, may define a coordinate. The detecting system may further include a voltmeter connected to the terminal to measure a voltage, and the detector may detect the position at which heat is generated in the secondary battery in the form of a coordinate based on a value measured by the voltmeter.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings to enable those skilled in the art to which the present invention pertains to easily carry out the present invention. The present invention may, however, be embodied in different forms and should not be construed as limited by the embodiments set forth herein.

The parts unrelated to the description, or the detailed descriptions of related well-known art that may unnecessarily obscure subject matters of the present invention, will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe his or her invention in the best ways.

Embodiment 1

The present invention provides a secondary battery as Embodiment 1.

Figure 1:
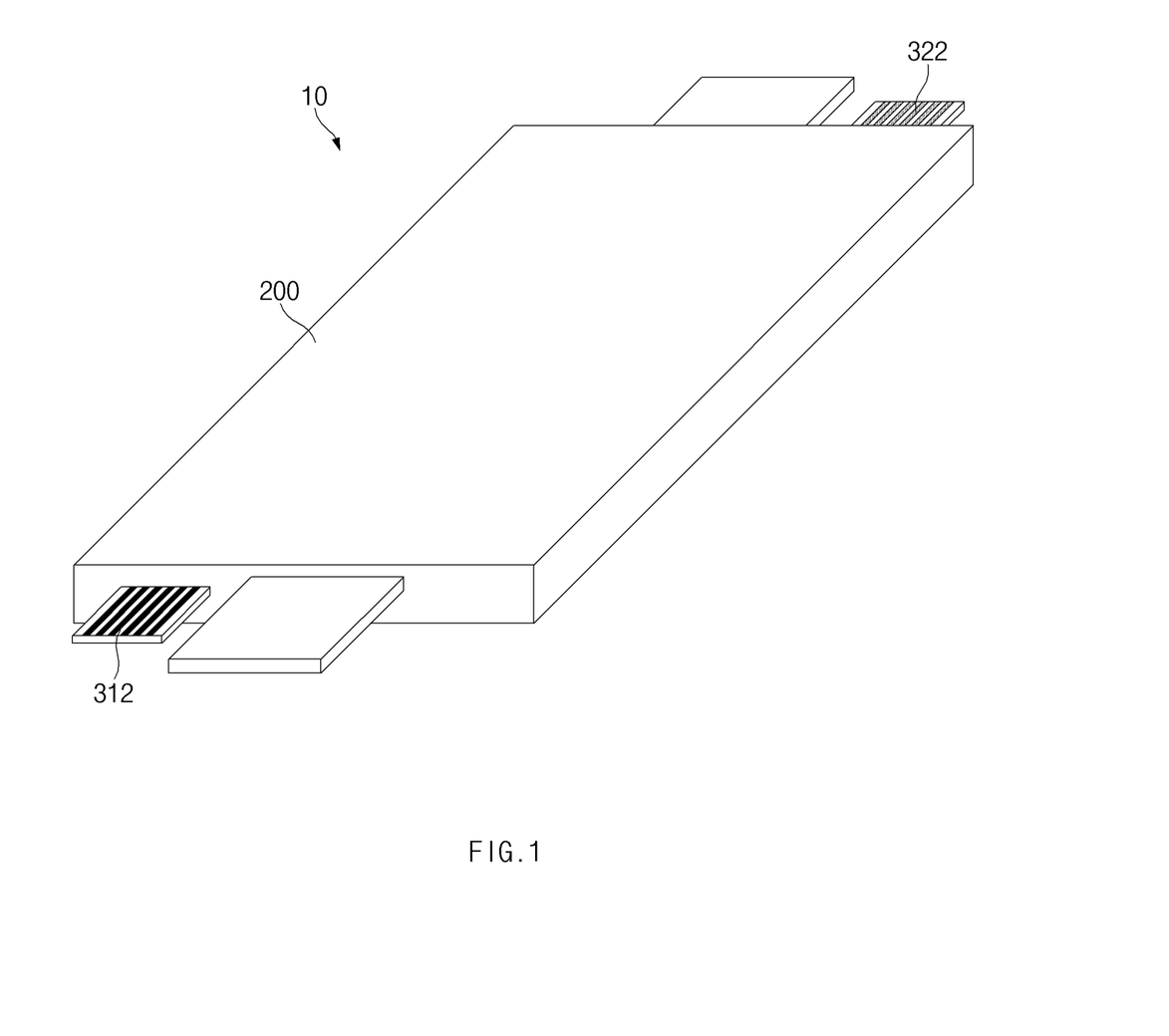
FIG. 1 is a perspective view schematically illustrating a secondary battery according to Embodiment 1 of the present invention.

FIG. 1 is a perspective view schematically illustrating a secondary battery according to Embodiment 1 of the present invention so as to easily understand the outer shape of the secondary battery.

A secondary battery 10 according to Embodiment 1 of the present invention may include an electrode assembly 100 and a case 200. The electrode assembly 100 may be provided in which unit cells 101 including a positive electrode 110, a negative electrode 120, and a separator 130 are stacked. The electrode assembly may further include a temperature sensor 300 capable of measuring a temperature.

The positive electrode 110 provided in each of the unit cells 101 may include a positive electrode collector and a positive electrode active material, and the negative electrode 120 may include a negative electrode collector and a negative electrode active material. The separator 130 may be disposed between the positive electrode 110 and the negative electrode 120. The separator 130 may serve to physically separate the positive electrode and the negative electrode so that the positive electrode and the negative electrode are not in contact with each other, and serve as a passage having a micro pore through which ions may chemically move.

The positive electrode 110, which constitutes the unit cell 101 of the electrode assembly 100, may include an aluminum collector 111 as the positive electrode collector, and the negative electrode 120 may include a copper collector 121 as the negative electrode collector. Since aluminum is excellent in oxidation stability and copper is excellent in reduction stability, the secondary battery 10 may exhibit high performance.

The temperature sensor 300 may be provided inside the electrode assembly 100 to measure the temperature of the secondary battery 10. Abnormal heat generation or flame may occur in the unit cell 101 constituting the electrode assembly 100. Here, abnormal rising of an internal temperature may be determined through the temperature sensor 300 to prevent problems and take necessary action in advance.

Figure 2:
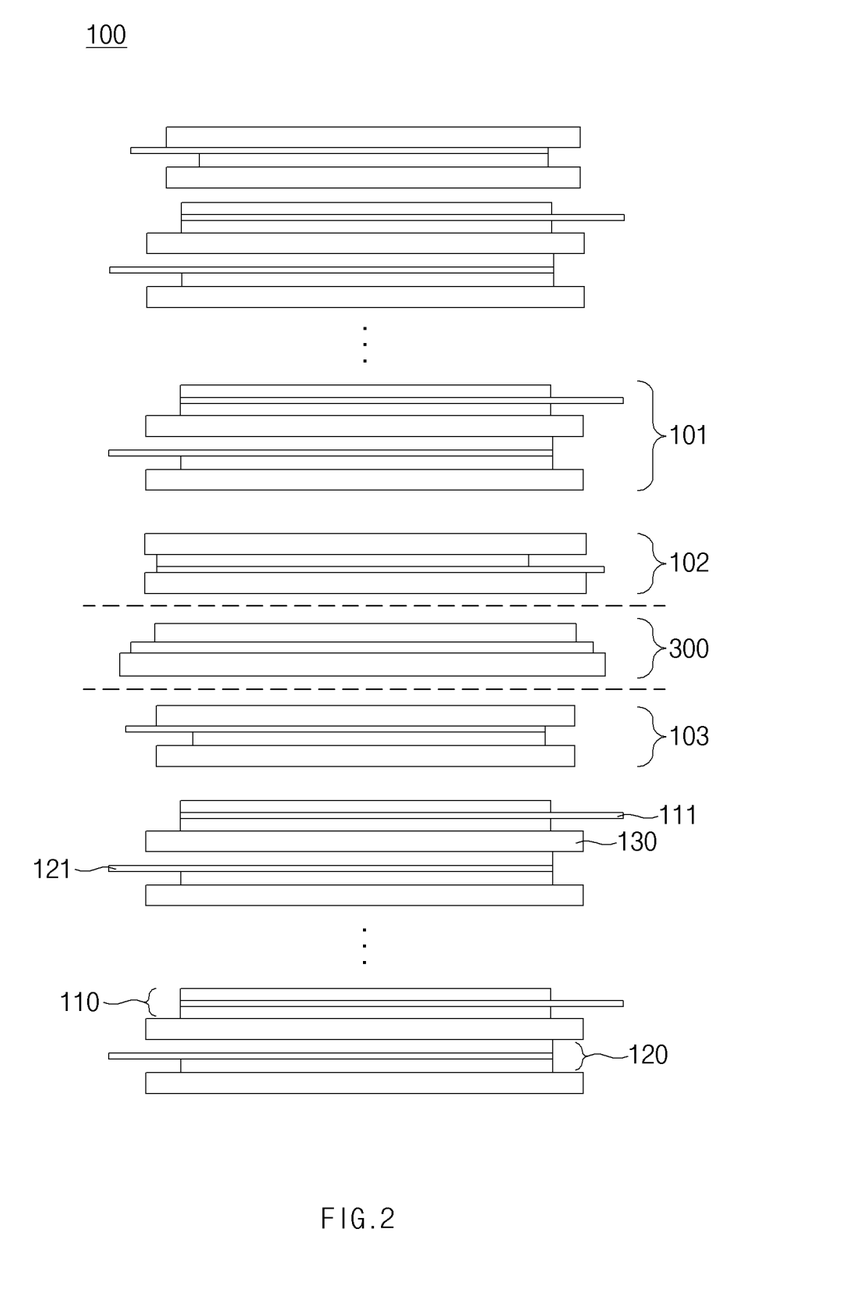
FIG. 2 is a view schematically illustrating a configuration in which components are stacked inside the secondary battery in FIG. 1 to manufacture an electrode assembly.

FIG. 2 is a view schematically illustrating a configuration in which components are stacked inside the secondary battery according to Embodiment 1 of the present invention so as to easily understand the configuration in which the components of the electrode assembly are stacked.

Referring to FIG. 2, the electrode assembly 100 of the secondary battery 10 according to Embodiment 1 of the present invention may include a plurality of unit cells 101, and may further include a first half cell 102 including the positive electrode 110 and the separator 130, and a second half cell 103 including the negative electrode 120 and the separator 130. Like the unit cell 101, the positive electrode 110 of the first half cell 102 may further include a positive electrode collector and a positive electrode active material, and the negative electrode 120 of the second half cell 103 may further include a negative electrode collector and a negative electrode active material.

The first half cell 102 and the second half cell 103 may be disposed between the plurality of unit cells. Here, the temperature sensor 300 may be disposed between the first half cell 102 and the second half cell 103. When the temperature sensor 300 is disposed between the first half cell 102 and the second half cell 103, ions such as lithium (Li) ions may be prevented from moving to the temperature sensor 300 so as to increase in accuracy of the sensor.

In the configuration in which the components of the electrode assembly 100 are stacked, the plurality of unit cells 101 may be stacked, and then the first half cell 102 and the second half cell 103 may be stacked on the plurality of unit cells 101 with the temperature sensor 300 interposed therebetween. Thereafter, the plurality of unit cells 101 may be re-stacked on the stacked product. Here, in terms of positions of the first half cell 102 and the second half cell 103, the first half cell 102 may be stacked below based on the temperature sensor 300, and the second half cell 103 may be stacked below.

The position at which the temperature sensor 300 is disposed is not limited to Embodiment 1 of the present invention, and the temperature sensor 300 may be disposed between the plurality of unit cells 101. Here, the temperature sensor 300 may be disposed in the middle of the unit cells 101 so that the same number of the unit cells 101 are stacked both above and below the temperature sensor 300. The temperature sensor 300 may be provided in plurality inside the electrode assembly 100.

Figure 3:
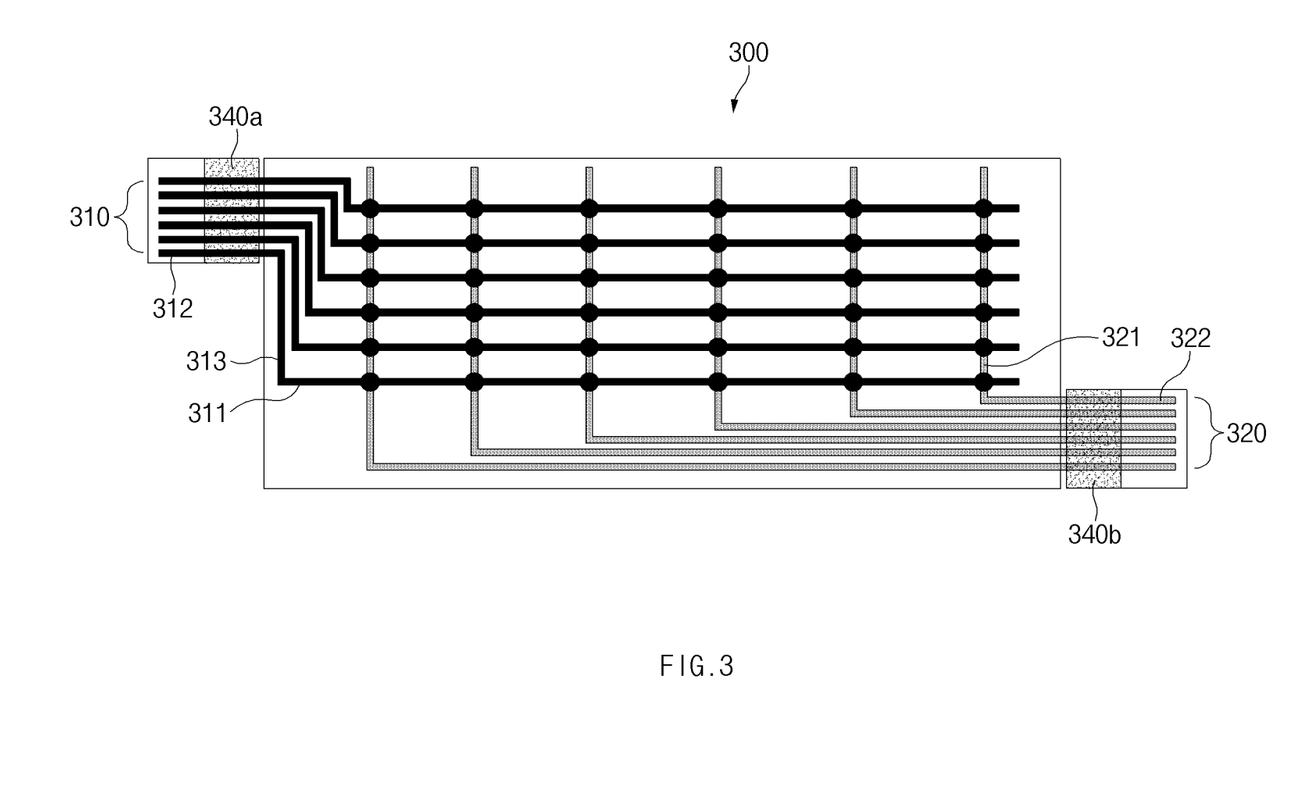
FIG. 3 is a plan view schematically illustrating a temperature sensor inside the secondary battery according to Embodiment 1 of the present invention when viewed from an upper side.
Figure 4:
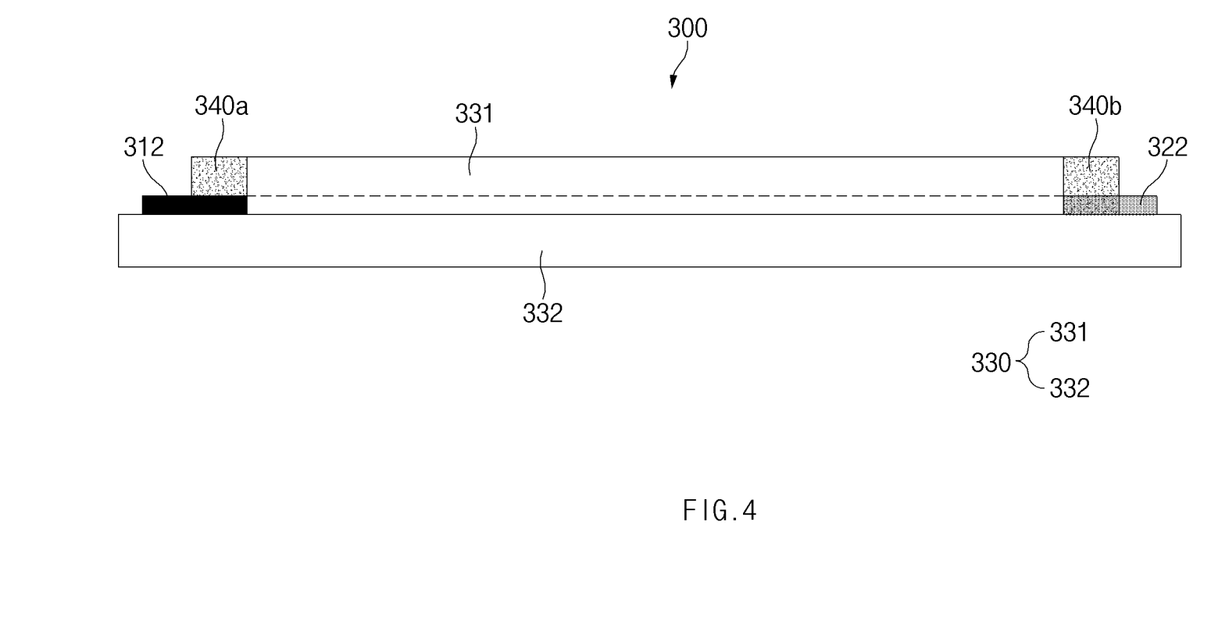
FIG. 4 is a plan view schematically illustrating the temperature sensor inside the secondary battery according to Embodiment 1 of the present invention when viewed from a front side.

FIGS. 3 and 4 are a plan view and front view which schematically illustrate a temperature sensor inside the secondary battery according to Embodiment 1 of the present invention when viewed from an upper side and a front side, respectively, so as to easily understand the configuration in which components of the temperature sensor are disposed.

The temperature sensor 300 inside the secondary battery 10 according to Embodiment 1 of the present invention may be provided in the form of a sheet, and particularly, may be a two-dimensional array thermocouple sheet. However, the form of the temperature sensor 300 is not limited thereto, and also the type of the sensor may vary.

A thermocouple is a device made of two types of metals so as to measure a wide range of temperatures, and is a temperature measurement device using thermo-electromotive force generated when heating (or cooling) junctions of the two types of metals. A range of temperatures used may vary depending on the types of constituent metals, and there are various thermocouples according to the range of temperatures used. The two-dimensional array thermocouple sheet is a thermocouple in which two types of metals are two-dimensionally arrayed.

Referring to FIG. 3, the temperature sensor 300 in the form of the two-dimensional array thermocouple sheet may include a first line 310 including a plurality of horizontal rows 311, and a second line 320 including a plurality of vertical columns 321. The plurality of horizontal rows 311 and the plurality of vertical columns 321 may cross each other to define a plurality of intersections. The intersections may be junctions of two types of metals used in the thermocouple. Here, since one intersection is defined at which one of the plurality of horizontal rows 311 and one of the plurality of vertical columns 321 meet each other, the intersection may be used to specify a point at which the temperature changes.

In the temperature sensor 300 in the form of the two-dimensional array thermocouple sheet according to Embodiment 1 of the present invention, the first line 310 may be made of chromel, and the second line 320 may be made of alumel or constantan. The chromel is an alloy of nickel (Ni) plus chromium (Cr), and the alumel is an alloy of nickel (Ni) plus aluminum, manganese, and so on. The constantan is an alloy of nickel (Ni) and copper (Cu).

A thermocouple consisting of chromel and constantan is available in a range of about −200° C. to about 900° C. and is relatively excellent and low in sensitivity and price, respectively. In addition, the output of the thermo-electromotive force is large. A thermocouple consisting of chromel and alumel is most commercially used and available in a range of about −200° C. to about 1300° C., and the thermo-electromotive force changes substantially linearly with respect to the temperature. Thus, the first line 310 may be made of chromel and the second line 320 may be made of alumel. A combination of metals constituting the thermocouple is not limited to the metals provided herein, and various combinations may be available. A K-type thermocouple and an E-type thermocouple are provided herein, but various thermocouples such as B-type, R-type, S-type, and T-type, may be applied.

Referring to FIG. 3, in the temperature sensor 300, the first line 310 may further include first terminals 312 and connection lines 313, and the second line 320 may further include second terminals 322. Each of the first terminals 312 may have one end protruding to one side of the case 200, and the connection lines 313 may be provided to be vertical on a view. Each of the connection lines 313, which are provided to be vertical and have different lengths, connects the horizontal row 311 and the first terminal 312 to each other to be paired. Since the connection line 313 is a component for connecting the horizontal row 311 to the first terminal 312, the horizontal row 311 may be connected to the first terminal 312 without the connection line 313 when the horizontal row 311 extends to form the first terminal 312. Each of the second terminals 322 may have one end protruding to the other side of the case 200 and horizontally extend to be connected to each of the vertical columns 321. The length by which the second terminal 322 horizontally extends may vary depending on the position of each of the vertical columns 321.

When the case 200 is provided around the outside of the electrode assembly 100 in which the unit cells 101 including the temperature sensor 300 are stacked, the first terminal 312 and the second terminal 322 may protrude to the outside of the case 200. Such protruding first terminal 312 and second terminal 322 may connect the temperature sensor 300 and other external devices to each other for interlocking. The state in which the first terminal 312 and the second terminal 322 protrude after the case 200 is assembled may be confirmed in FIG. 1.

The temperature sensor 300 may further include a PET film 330 that wraps and supports the first line 310 and the second line 320. The PET film 330 serving as an insulator may bring about an effect of protecting the temperature sensor 300. Thus, the PET film 330 may have low electrical conductivity, high thermal stability, and high mechanical strength. In general, the PET film 330 may be made of a material such as polyethylene terephthalate, polyester, polyethylene, or the like.

The PET film 330 may include an upper PET film 331 and a lower PET film 332. Here, the upper PET film 331 may be disposed on top surfaces of the first line 310 and the second line 320, and the lower PET film 332 may be disposed on bottom surfaces of the first line 310 and the second line 320. In addition, the upper PET film 331 may be provided on a portion excluding top surfaces of one end of the first terminal 312 protruding to one side of the case 200, and one end of the second line 322 protruding to the other side of the case 200. The upper PET film 331 may be provided to extend up to a bottom surface of each of the first terminal 312 and the second terminal 322.

Specifically, referring to FIGS. 3 and 4, the upper PET film 331 may have a cross section having a rectangular shape when viewed from an upper side. Here, the upper PET film 331 may wrap all of the horizontal rows 311, the connection lines 313, and the vertical lines 321. The lower PET film 332 may have a cross section in which two small rectangular shapes are added to a left edge and a right edge, respectively, so as to cover even the bottom surfaces of the first terminal 312 and the second terminal 322 protruding from the same rectangular shape as the upper PET film 331. Here, based on FIG. 3, the protruding first terminal 312 is disposed at an upper left end and the protruding second terminal 322 is disposed at a lower right end. However, the positions at which the terminals are disposed are not necessarily limited thereto and may change.

The PET film 330 may support the temperature sensor 300 to maintain the temperature sensor 300 to be in a predetermined shape, and may prevent electricity and heat from flowing through the temperature sensor 300 to improve the efficiency of the temperature sensor 300. The upper PET film 331 does not cover the top surfaces of the protruding first terminal 312 and second terminal 322 so that the first terminal 312 and the second terminal 322 may be efficiently connected to other external devices.

The temperature sensor 300 may further include sealing parts 340a and 340b at boundaries between the upper PET film 331 and the lower PET film 332. That is, the temperature sensor 300 may further include a sealing part 340a disposed at a boundary near the first terminal 312 and a sealing part 340b disposed at a boundary near the second terminal 322. The sealing parts 340a and 340b may be parts to be sealed when the case 200 is assembled outside the electrode assembly 100, and when sealing the sealing parts 340a and 340b, a method such as a thermal fusion, may be used. The case 200 may be sealed through sealing so that the inside thereof is blocked from the outside.

Such a secondary battery 10 according to Embodiment 1 of the present invention may include the temperature sensor 300 in the form of the two-dimensional array thermocouple sheet so as to easily determine whether a problem such as heat generation occurs inside the secondary battery 10 and concretely specify a point at which the problem occurs, to deal with the problem. Thus, the safety of the product in which the secondary battery 10 is used may be improved.

Embodiment 2

The present invention provides, as Embodiment 2, a detecting system which detects a heat generation phenomenon of a secondary battery.

Figure 5:
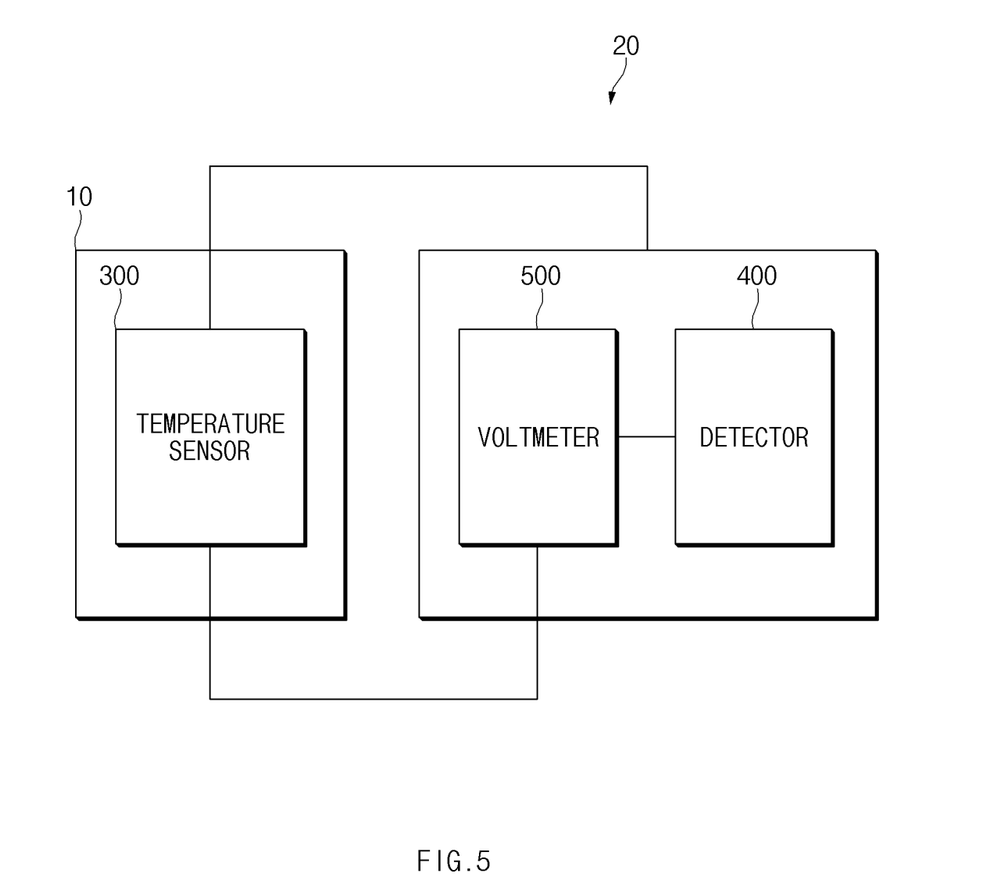
FIG. 5 is a block diagram schematically illustrating a configuration of a detecting system according to Embodiment 2 of the present invention.

FIG. 5 is a block diagram schematically illustrating a configuration of a detecting system according to Embodiment 2 of the present invention so as to easily understand a relationship between components of the detecting system.

Hereinafter, the detailed description of the same components as the components of the secondary battery 10 according to Embodiment 1 of the present invention will be omitted.

Referring to FIG. 5, a detecting system 20 according to Embodiment 2 of the present invention may include a temperature sensor 300 and a detector 400 so as to detect a heat generation phenomenon of the secondary battery 10. The temperature sensor 300 may be disposed inside the secondary battery 10, and the detector 400 may be disposed outside the secondary battery 10. The detector 400 may be interlocked with the temperature sensor 300 so as to detect whether and a position at which heat is generated in the secondary battery 10, based on a value measured by the temperature sensor 300. That is, when an abnormal phenomenon such as heat generation, occurs inside the secondary battery 10, the temperature sensor 300 may measure the abnormal phenomenon, and, based on values measured by the temperature sensor 300, the detector 400 may determine whether the abnormal phenomenon such as heat generation occurs and specify a specific heat generation position.

The temperature sensor 300 may include a first line 310 including a plurality of horizontal rows 311, and a second line 320 including a plurality of vertical columns 321 and may be a two-dimensional array thermocouple sheet in which the plurality of horizontal rows 311 and the plurality of vertical columns 321 cross each other. The temperature sensor 300 in the form of the two-dimensional array thermocouple sheet may be the same as Embodiment 1, and thus the detailed description thereof will be omitted.

The temperature sensor 300 may further include a terminal protruding from one end of each of the first line 310 and the second line 320 to one side of the case 200. The detecting system 20 may further include a voltmeter 500 connected to the terminal formed as above to measure a voltage. The voltmeter 500 may measure the voltage, and the characteristic of the thermocouple, in which a higher voltage is measured at a position having a temperature higher than the temperature of a surrounding area, may be used to know whether and a position at which heat is generated inside the secondary battery 10.

In the temperature sensor 300, the plurality of horizontal rows 311 and the plurality of vertical columns 321 may cross each other to define intersections, and each of the intersections may define a coordinate. For example, an intersection, at which the first horizontal row among the horizontal rows 311 and the first vertical column among the vertical columns 321 meet each other, may be $(X_1, Y_1)$, and an intersection, at which the first horizontal row among the horizontal rows 311 and the second vertical column among the vertical columns 321 meet each other, may be ($X_2$, $Y_1$). However, this is just one example, and the coordinate may be variously defined.

When each of the intersections defines a coordinate as above, the detector 400 may specify the heat generation position of the secondary battery 10 in the form of a coordinate based on values measured by the voltmeter 500. Thus, a point at which a problem occurs inside the secondary battery 10 may be relatively concretely specified, and the position may be easily identified. Here, the coordinate specifying the heat generation position may be provided in plurality according to a gap between coordinates. However, also in this case, the problem occurrence point may be concretely specified and the position may be easily identified.

In an electric vehicle, a large-capacity secondary battery 10 (ESS), or the like, in which multiple secondary batteries 10 are concentrated, abnormal heat generation or flame may be likely to be rapidly transferred to the whole system even when occurring in one battery. Therefore, in terms of the safety of the whole system and the property protection, it may be advantageous to rapidly identify the battery with the problem within the whole system and take action in advance. In such aspects, the detecting system 20 according to Embodiment 2 of the present invention may rapidly detect the abnormal battery with a problem and accordingly, may exhibit an effect of protecting a risk of making the problem to be spread to a larger unit.

The secondary battery 10 according to the present invention may include the electrode assembly, in which the plurality of unit cells including the positive electrode, the negative electrode, and the separator are stacked, and the case in which the electrode assembly is accommodated. The electrode assembly may further include the temperature sensor that measures the temperature.

Accordingly, the temperatures may be traced in real-time in the several positions within the secondary battery, and the time and point at which the abnormal heat generation starts may be specified. In addition, on that basis, the action may early deal with the abnormal battery in the whole system so as to prevent deterioration due to transfer of heat to the whole system and improve the safety of the product and the stability of the whole system.

While the present invention has been shown and described in connection with the exemplary embodiments, it will be apparent to those skilled in the art that modifications and variations can be made without departing from the spirit and scope of the invention as defined by the appended claims.

What is claimed is:

1. A secondary battery comprising:
an electrode assembly in which a plurality of unit cells comprising a positive electrode, a negative electrode, and a separator are stacked; and
a case in which the electrode assembly is accommodated,
wherein the electrode assembly further comprises a temperature sensor configured to measure a temperature therein, the temperature sensor being provided in the form of a two-dimensional array thermocouple sheet is disposed between the plurality of unit cells, wherein the temperature sensor comprises:
a first line comprising a plurality of horizontal rows; and
a second line comprising a plurality of vertical columns,
wherein the plurality of horizontal rows and the plurality of vertical columns cross each other to define a plurality of intersections,
wherein, in the temperature sensor, the first line further comprises a first terminal protruding from one end of the first line to one side of the case, and a connection line extending vertically so as to connect the first terminal to each of the plurality of horizontal rows, and
the second line further comprises a second terminal protruding from one end of the second line to another side of the case and horizontally extending to be connected to each of the plurality of vertical columns.

2. The secondary battery of claim 1, wherein, in the electrode assembly, the positive electrode comprises an aluminum collector, and the negative electrode comprises a copper collector.

3. The secondary battery of claim 1, wherein the electrode assembly comprises:
a first half cell comprising the positive electrode and the separator; and
a second half cell comprising the negative electrode and the separator,
wherein the temperature sensor is disposed between the first half cell and the second half cell.

4. The secondary battery of claim 3, wherein, in the electrode assembly, the temperature sensor, the first half cell, and the second half cell are stacked between the plurality of unit cells.

5. The secondary battery of claim 1, wherein, in the temperature sensor, the first line is made of chromel, and the second line is made of alumel or constantan.

6. The secondary battery of claim 1, wherein the temperature sensor further comprises a PET film configured to wrap and support the first line and the second line.

7. The secondary battery of claim 6, wherein the PET film comprises:
an upper PET film disposed on top surfaces of the first line and the second line; and
a lower PET film disposed on bottom surfaces of the first line and the second line,
wherein the upper PET film is provided on a portion excluding top surfaces of one end of the first terminal protruding to the one side of the case and one end of the second line protruding to the another side of the case, and
the lower PET film is provided to extend up to a bottom surface of each of the first terminal and the second terminal,
wherein the temperature sensor further comprises a sealing part at a boundary between the upper PET film and the lower PET film.

8. A detecting system, which detects a heat generation phenomenon of a secondary battery, the detecting system comprising:
a temperature sensor disposed inside the secondary battery; and
a detector interlocked with the temperature sensor,
wherein the detector detects whether heat is generated and a position at which heat is generated in the secondary battery, based on a value measured by the temperature sensor, the temperature sensor being provided in the form of a two-dimensional array thermocouple sheet is disposed between a plurality of unit cells of the secondary battery, wherein the temperature sensor comprises:
a first line comprising a plurality of horizontal rows; and
a second line comprising a plurality of vertical columns,
wherein the plurality of horizontal rows and the plurality of vertical columns cross each other to define a plurality of intersections, wherein, in the temperature sensor, the first line further comprises a first terminal protruding from one end of the first line to one side of a case of the secondary battery, and a connection line extending vertically so as to connect the first terminal to each of the plurality of horizontal rows, and the second line further comprises a second terminal protruding from one end of the second line to another side of the case and horizontally extending to be connected to each of the plurality of vertical columns.

9. The detecting system of claim 8, wherein the detecting system further comprises a voltmeter connected to the first or second terminal to measure a voltage, wherein the detector detects the position at which heat is generated in the secondary battery, in form of a coordinate based on a value measured by the voltmeter.

10. A secondary battery comprising:

an electrode assembly in which a plurality of unit cells comprising a positive electrode, a negative electrode, and a separator are stacked; and a case in which the electrode assembly is accommodated, wherein the electrode assembly further comprises a temperature sensor configured to measure a temperature therein, the temperature sensor being provided in the form of a two-dimensional array thermocouple sheet is disposed between the plurality of unit cells, wherein the temperature sensor comprises:

a first line comprising a plurality of horizontal rows; and a second line comprising a plurality of vertical columns, wherein the plurality of horizontal rows and the plurality of vertical columns cross each other to define a plurality of intersections, wherein, in the temperature sensor, the first line is made of chromel, and the second line is made of alumel or constantan.

11. A detecting system, which detects a heat generation phenomenon of a secondary battery, the detecting system comprising:

a temperature sensor disposed inside the secondary battery; and a detector interlocked with the temperature sensor, wherein the detector detects whether heat is generated and a position at which heat is generated in the secondary battery, based on a value measured by the temperature sensor, the temperature sensor being provided in the form of a two-dimensional array thermocouple sheet is disposed between a plurality of unit cells of the secondary battery, wherein the temperature sensor comprises:

a first line comprising a plurality of horizontal rows; and a second line comprising a plurality of vertical columns, wherein the plurality of horizontal rows and the plurality of vertical columns cross each other to define a plurality of intersections, wherein, in the temperature sensor, the first line is made of chromel, and the second line is made of alumel or constantan.

* * * * *